(12) United States Patent
Myllyla

(10) Patent No.: US 6,542,436 B1
(45) Date of Patent: Apr. 1, 2003

(54) ACOUSTICAL PROXIMITY DETECTION FOR MOBILE TERMINALS AND OTHER DEVICES

(75) Inventor: Ville Myllyla, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/608,090

(22) Filed: Jun. 30, 2000

(51) Int. Cl.$^7$ ................................................ H04M 1/00
(52) U.S. Cl. ........................ 367/95; 379/422; 455/569
(58) Field of Search .............................. 367/87, 95, 96, 367/99; 379/422, 433, 420; 455/569, 575

(56) References Cited

U.S. PATENT DOCUMENTS

| | | | |
|---|---|---|---|
| 4,417,278 A | | 11/1983 | Hensleigh et al. ........... 358/188 |
| 5,729,604 A | * | 3/1998 | Van Schyndel et al. ..... 379/388 |
| 5,790,679 A | * | 8/1998 | Hawker et al. .............. 381/163 |
| 6,002,949 A | * | 12/1999 | Hawker et al. .............. 455/569 |
| 6,104,808 A | * | 8/2000 | Alameh et al. .............. 379/433 |
| 6,115,620 A | * | 9/2000 | Colonna et al. ............. 455/569 |

FOREIGN PATENT DOCUMENTS

GB             978741        12/1964

* cited by examiner

Primary Examiner—Ian J. Lobo
(74) Attorney, Agent, or Firm—Harrington & Smith, LLP

(57) ABSTRACT

A method and a device for detecting if an object is in proximity to the device, wherein sound (audio) transducers already found in the device are used to realize the proximity detection function, along with digital signal processing or equivalent means. The audio transducers are preferably those designed for use with human hearing and speaking capabilities in the range of about 20 Hz to about 20 kHz, and need not be specially designed transducers. The method includes steps of generating a measurement signal; driving an output acoustic transducer of the device with the measurement signal; monitoring an input acoustic transducer of the device to detect the measurement signal; and determining that an object is in proximity to the device based on a detected alteration of the measurement signal. The device may comprise a mobile telephone, such as a cellular telephone, or a personal communicator. When the device includes a mobile telephone, the step of determining can be used to verify that a handsfree mode of operation can be entered, and/or to set a volume of a signal driving a speaker, and/or to select, modify, or tune an audio processing technique. The step of determining can also be used to automatically enter a handset mode of operation from a handsfree mode of operation. The steps of monitoring and determining include steps of operating plural adaptive filters in parallel on the same input data, with different step sizes, for generating first and second impulse response estimates, respectively, and comparing a difference between the first and second impulse response estimates to a threshold.

17 Claims, 4 Drawing Sheets

ACOUSTICAL PROXIMITY DETECTION FOR MOBILE TERMINALS AND OTHER DEVICES

FIELD OF THE INVENTION

This invention relates generally to devices, such as mobile terminals, radiotelephones and cellular telephones and, in particular, to techniques for sensing the proximity of a user to the device.

BACKGROUND OF THE INVENTION

There are many kinds of proximity sensors which are used, for example, as limit switches in various kinds of equipment, or to detect motion of objects relative to each other, as well as for other types of control purposes. Typically, these sensors are based on photoelectric, ultrasonic or capacitive principles.

One example of the use of the proximity detection is related to telephones, in particular (but not exclusively) radiotelephones, such as cellular telephones and personal communicators. A feature known as Integrated HandsFree (IHF) makes it possible to use the phone without holding it on the ear or in the hand. In the handsfree mode the sound pressures produced by the earpiece capsule (which may be thought of as a miniature audio speaker) should be much louder to make far-end speech audible to longer distances. On the other hand, when the phone is used on the ear, the sound pressures should be in a normal range. The problem then is how to detect and switch between these two modes.

Proximity detection solves this problem by detecting when the phone is leaving or approaching the ear. According to this detection information the correct level or processing for the earpiece capsule can be selected. Thus, the proximity detection can make the IHF feature fully automatic.

Proximity sensors can be classified into several major types related to the specific properties used to initiate a controlling action. These include the following: field-based, photoelectric and ultrasonic sensors. Furthermore, there are two types of sensors that use field-based detection methods: inductive and capacitive sensors.

Generally, the photoelectric principle is the most widely used, while the capacitive is the second most widely used for proximity detection purposes. Ultrasounds are used mainly for accurate range detection, and not for simple proximity detection.

In a typical case where there is a need for proximity detection, some type of proximity sensor is required to be installed in the device. However, this involves adding cost, weight, complexity and, typically, an additional power drain to the device.

As can be appreciated, it would be beneficial to provide a method and a system for adding a proximity sensing functionality to a device, wherein no additional equipment or components are required.

OBJECTS AND ADVANTAGES OF THE INVENTION

It is a first object and advantage of this invention to provide a proximity sensing functionality that may be added to a device without also adding additional equipment or components to the device.

It is another object and advantage of this invention to provide a proximity sensing functionality for a mobile telephone, such as a cellular telephone or a personal communicator, that uses the already existing microphone and speaker components, in conjunction with a suitably programmed data processor.

SUMMARY OF THE INVENTION

The foregoing and other problems are overcome and the objects of the invention are realized by methods and apparatus in accordance with embodiments of this invention.

The teachings of this invention provide a method and a system which can be used to detect objects and, more generally, environmental changes near a device, such as a mobile telephone, within which the method and system are embodied. Depending on the purpose of the device the detection information can be used to determine whether there are objects near the device, or if the device has a certain orientation relative its environment, and/or if the device is approaching or leaving a certain orientation. The proximity detection method and system are based on an acoustic principle.

An important feature of the teachings herein is that one may utilize sound (audio) transducers already found in the device to realize the proximity detection function, along with digital signal processing or equivalent means. The audio transducers employed by the invention are preferably those designed for use with human hearing and speaking capabilities in the range of about 20 Hz to about 20 kHz, and need not be specially designed transducers, such as transducers designed for ultrasonic applications above 20 kHz.

That is, the invention can utilize the sound transducers that are already used in the device for speech transmission (output speech and input speech) or for some other purpose. Thus, there is no need for additional sensor elements. Furthermore, if the device can provide digital processing means, such as A/D and D/A converters and a signal processor, the device can be constructed to include the proximity detection function without requiring any additional hardware components. Only a suitable operating program is required to implement the proximity detection function in accordance with these teachings.

Also, and assuming that the sound transducers that are already used in the device are employed, then there is no need to redesign the device's enclosure, and no extra space is required.

The proximity sensing can be done in parallel with the ordinary use of transducers. In this case the transducers are in use already, and the additional power required to implement the proximity sensing function is minimal.

Furthermore, if the sensor somehow fails, the resulting sensing result is that there is an object in close proximity. For example, if the sensing is used with the IHF function, the phone remains in the handset mode and there is no possibility that high sound pressures will be generated near the user's ear. If the earpiece sensor element fails, then there is clearly no possibility to generate excessive sound pressure near the user's ear. Further, the sensing algorithm can detect if one of the sensors have failed.

The method is based on a measurement signal that drives the acoustical transducer in the application device. The other transducer in the application device monitors the measurement signal. Any objects near the device alter the measurement signal in a certain way, and these alterations indicate if there are objects near or on the device.

Disclosed herein is a method and a device for detecting if an object is in proximity to the device. The method includes steps of generating a measurement signal; driving an output acoustic transducer of the device with the measurement signal; monitoring an input acoustic transducer of the device to detect the measurement signal; and determining that an object is in proximity to the device based on a detected alteration of the measurement signal. The device may comprise a mobile telephone, such as a cellular telephone, or a personal communicator.

When the device comprises a mobile telephone, the step of determining can be used to verify that a handsfree mode of operation can be entered, and/or to set a volume of a signal driving a speaker, and/or to select, modify, or tune an audio processing technique. The step of determining can also be used to automatically enter a handset mode of operation from a handsfree mode of operation.

In a presently preferred embodiment of this invention the steps of monitoring and determining include steps of operating plural adaptive filters in parallel on the same input signal, with different step sizes, for generating first and second impulse response estimates, respectively, and comparing a difference between the first and second impulse response estimates to a threshold.

In the device a monitoring unit and a determining unit include a decimator for decimating a measurement signal received from a microphone; an anti-comb filter for enhancing the signal to noise ratio (SNR) of the received measurement signal; first and second adaptive filters operated in parallel on the filtered measurement signal, with different step sizes, for generating first and second impulse response estimates, respectively; and a comparator for comparing a difference between the first and the second impulse response estimates to a threshold.

BRIEF DESCRIPTION OF THE DRAWINGS

The above set forth and other features of the invention are made more apparent in the ensuing Detailed Description of the Invention when read in conjunction with the attached Drawings, wherein:

FIG. 5A depicts in greater detail the anti-comb filter of FIG. 4, while

DETAILED DESCRIPTION OF THE INVENTION

Figure 1:
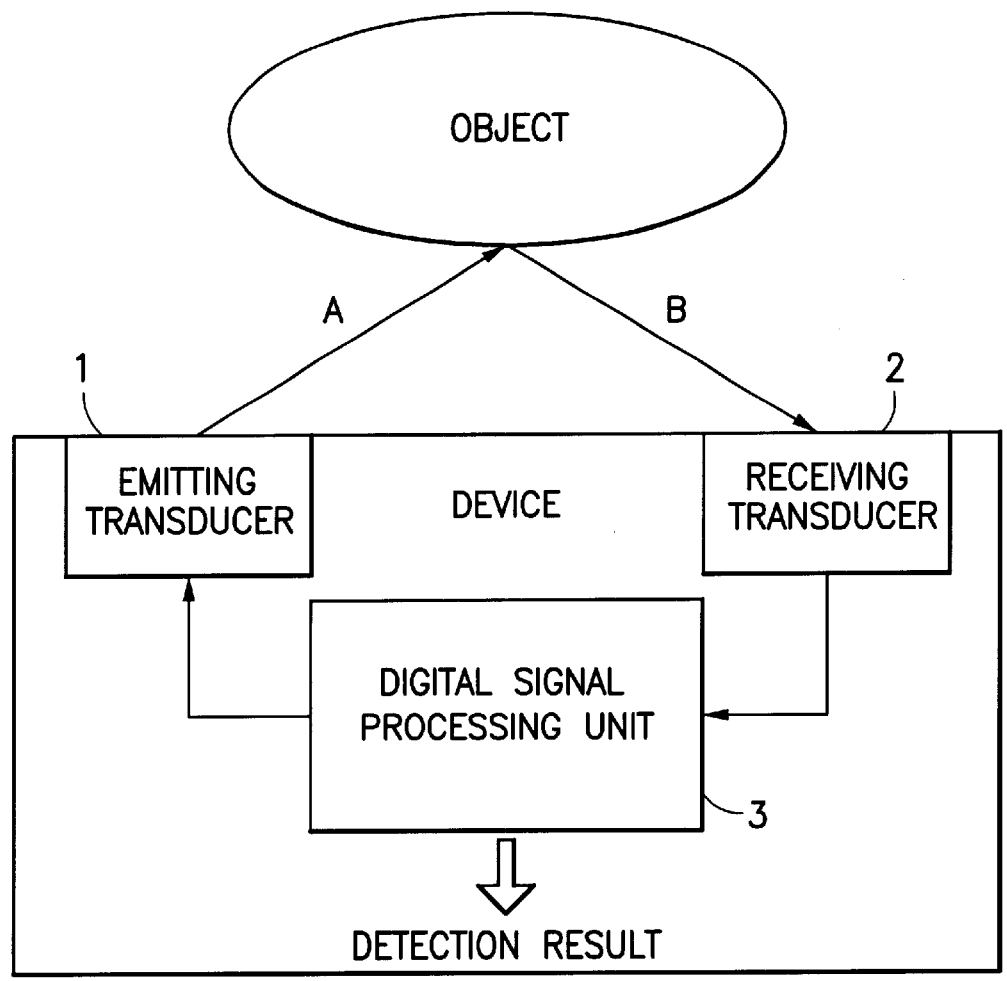
FIG. 1 is a simplified block diagram of a device that incorporates the proximity detection system in accordance with the teachings of this invention.

FIG. 1 illustrates the acoustic-based proximity detection system at a general level. A measurement signal (A) is fed through a sound emitting transducer 1. A sound receiving transducer 2 is used to measure or monitor the response of the measurement signal (B). If there are any objects near the application device, the measurement signal (A) is reflected from the object back to the application device and to the receiving transducer 2. If there are no objects in close proximity, there are no reflections. The lack of or existence of the reflections is detected from the response signal (B) measured by the receiving transducer 2. A signal processing unit 3 generates the measurement signal (A) and the response signal (B) is fed to it. Finally, utilizing both of the signals (A, B) the signal processing unit 3 calculates the proximity detection result.

Figure 2:
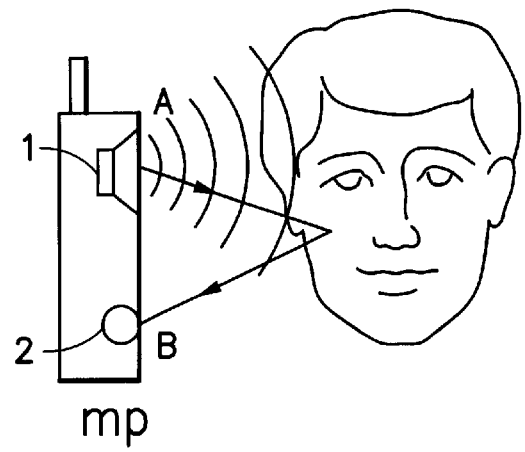
FIG. 2 shows a phone in proximity to a user's head.

FIG. 2 illustrates an example of the detection method in a mobile phone (MP). In this case the microphone and the earpiece capsule of the phone are used as the sound emitting transducer 1 and the sound receiving transducer 2, respectively.

There are a number of ways to extract the proximity information from the response signal (B) by the digital signal processing unit 3. The presently preferred embodiment is based on adaptive filtering. The adaptive filter models the impulse response between the emitting transducer 1 and the receiving transducer 2 utilizing both the measurement signal (A) and its response signal (B). A new impulse response estimate is calculated for each new sample obtained from the receiving transducer 2. Thus, the update rate of the detection depends on the sampling frequency. From the impulse response estimate the reflections can be detected. To further improve the proximity detection, pattern recognition algorithms can be used to classify these impulse response estimates into two categories, for example, an object present and an object not present. This information is then used for control purposes (e.g., to control the level of sound that is generated by the earpiece transducer).

Figure 3:
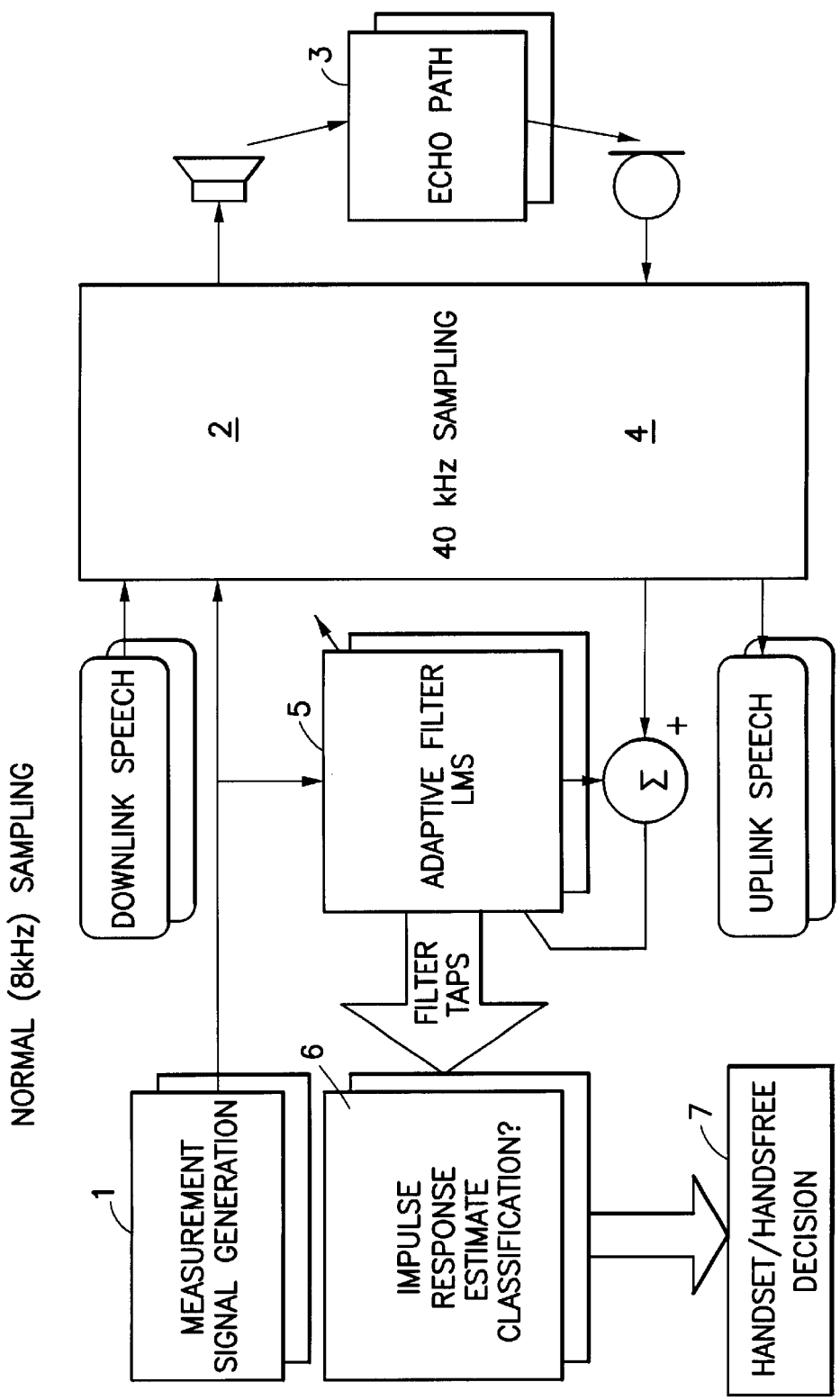
FIG. 3 is a simplified block diagram of the phone of FIG. 2, constructed to include the proximity detection system and method of this invention.

FIG. 3 illustrates a simplified example of a system which utilizes the above described acoustic proximity detection method in the mobile phone. The system operates as follows:

1. A measurement signal is generated using an 8 kHz (by example) sampling frequency.

2. The measurement signal is interpolated to a higher sampling frequency (e.g., 40 kHz) and high-pass filtered (cut-off 16 kHz). A downlink speech signal received from a base station transmitter is summed to the measurement signal.

3. The measurement signal is altered by the environment, such as the presence of the user's head.

4. From the microphone signal the response of the measurement signal is extracted by high-pass filtering. The signal is then decimated to an 8 kHz sampling frequency. The normal uplink speech is extracted from the microphone signal by low-pass filtering (assuming that the normal speech frequencies lie below the decimated measurement signal).

5. An adaptive filter function estimates the impulse response of the acoustical signal path. In the presently preferred embodiment of this invention the adaptive filter function is comprised of two adaptive filters operating in parallel on the same input, one being a fast acting monitoring filter and the other being a slower acting modelling filter.

6. The impulse response estimate could be classified by comparing it to a pre-recorded handsfree impulse response. In the presently preferred embodiment the difference between the outputs of the two adaptive filters is compared to a predetermined threshold value.

7. Finally, the classification result is used to determine which of the modes should be chosen, i.e., handset or handsfree.

Figure 4:
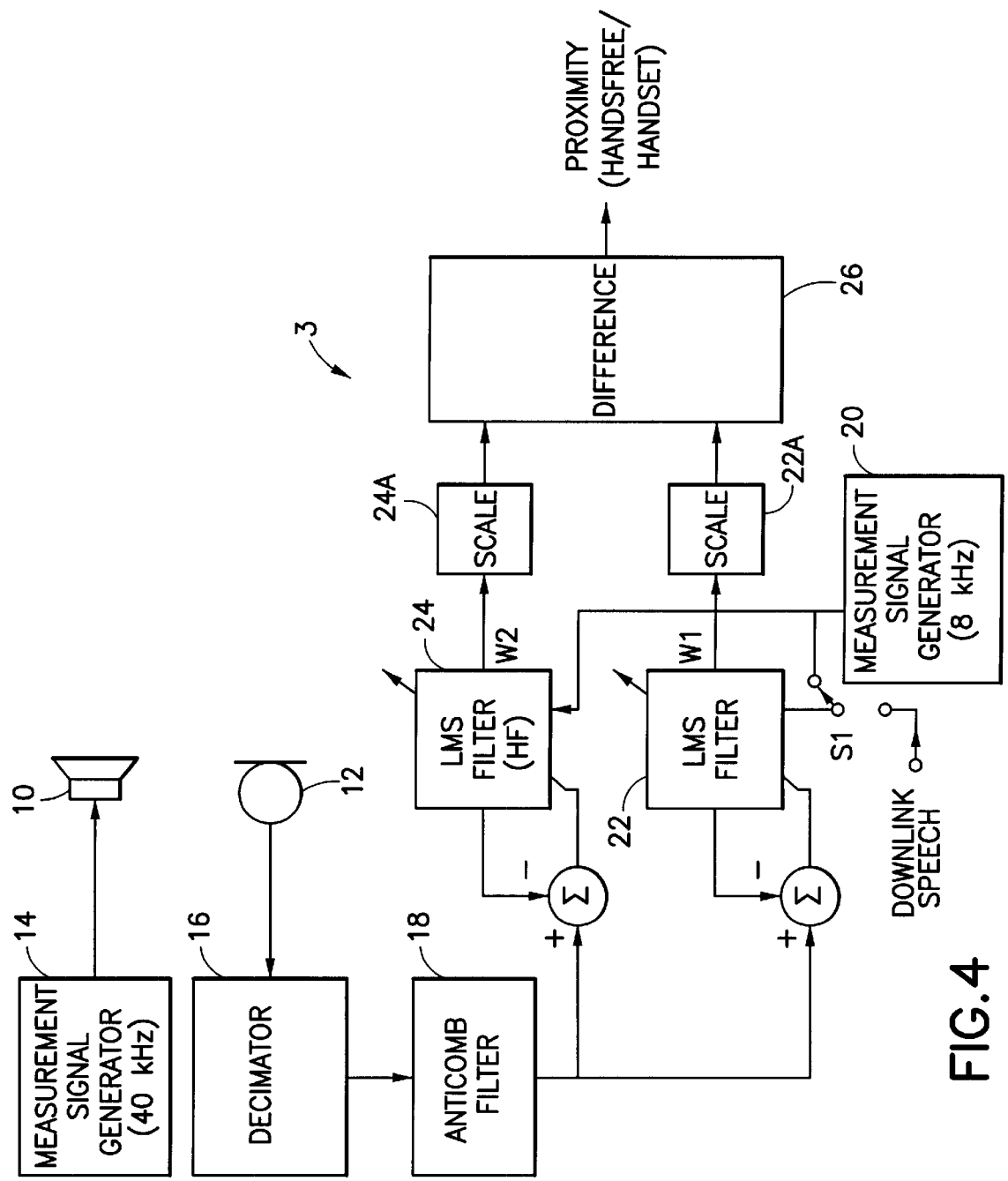
FIG. 4 is a block diagram of a presently preferred embodiment of the proximity sensing signal processing unit using two adaptive filters and a comparison function.

FIG. 4 is a block diagram of a presently preferred embodiment of the proximity sensing signal processing unit 3. The illustrated circuitry is assumed for this discussion to be embodied in a mobile phone, although other types of devices can benefit from these teachings as well. The sound emitting transducer 1 of FIG. 1 is preferably embodied as the already present earpiece capsule or speaker 10, while the sound receiving transducer 2 of FIG. 1 is preferably embodied as the already present microphone 12. While the use of these already present components is preferred, in some applications it may be desirable to provide a speaker and/or a microphone that is dedicated to the proximity detection function.

Driving the speaker 10 is a measurement signal generator 14 for the 40 kHz sampling frequency. An analog signal generator can be used, although it is preferred to employ digital techniques wherein (8 kHz case) an odd-perfect bit sequence of length 8 (0, 1, 1, −1, 1, 1, 1, −1) forms a first part of the period, and a second part of the period is formed by changing the sign (0, −1, −1, 1, −1, −1, −1, 1). The period is then repeated. Because of the periodicity of this signal, the interpolation to 40 kHz can be done off-line, and only one sequence of the interpolated signal is needed to generate the 40 kHz signal. Thus, the measurement signal output from block 14 is generated by fetching the sequence of length 40 from memory, and only the sign needs be changed from sequence to sequence.

Figure 5A:
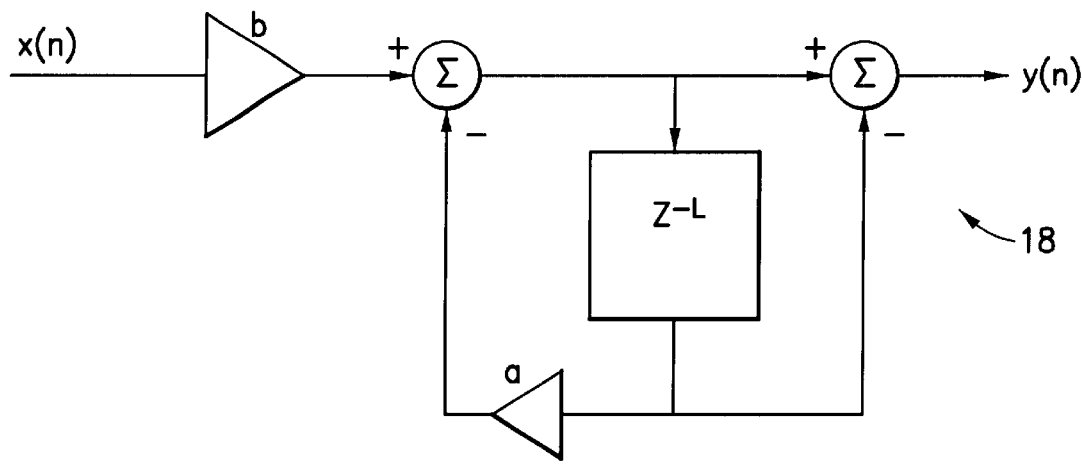
Figure 5B:
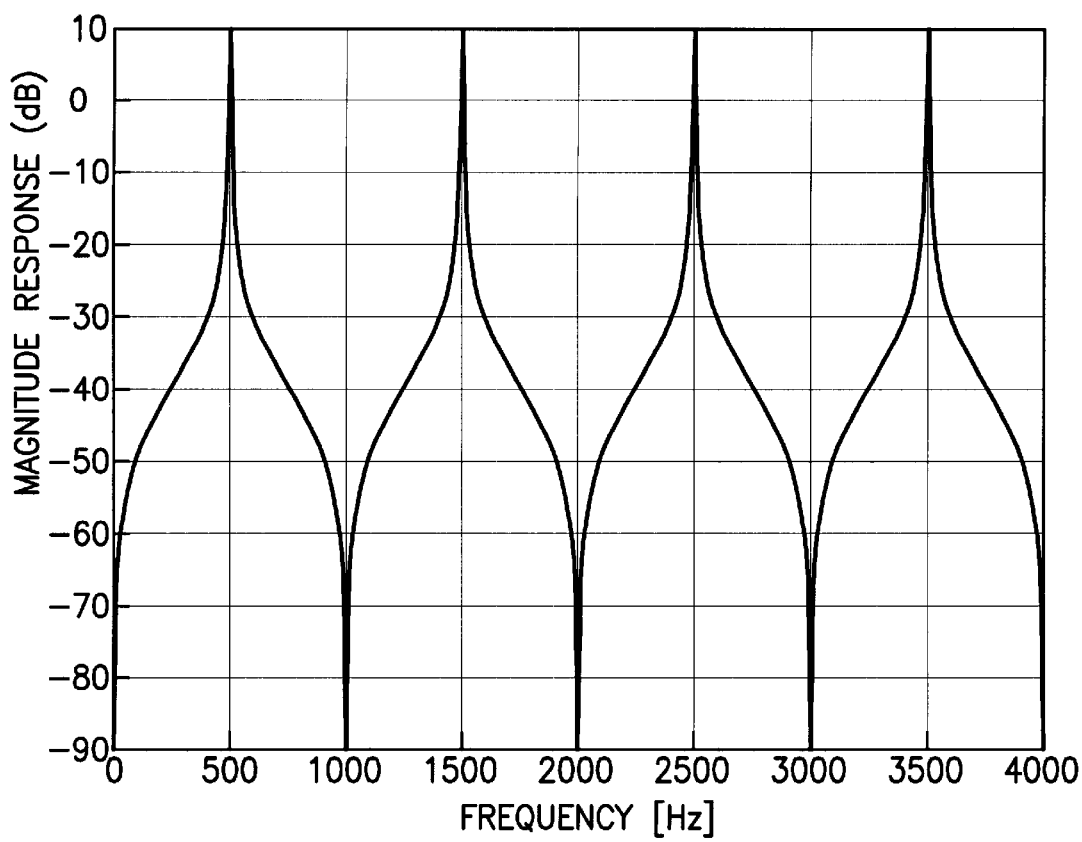
FIG. 5B shows the anti-comb filter frequency response.

The output of the microphone 12 is coupled to a decimator 16 which lowers the sampling frequency from 40 kHz to 8 kHz. After decimation, all signal processing is performed at the 8 kHz sampling frequency. Next, an anti-comb filter 18 is used to filter the decimated microphone signal. Anti-comb filtering is preferred as it enhances the signal to noise ratio (SNR). The enhancement effect is achieved since the power spectrum of the measurement signal is composed of regularly spaced peaks. During filtering, only the peaks remain intact, and all other frequencies are attenuated. FIG. 5A depicts in greater detail a preferred embodiment of the anti-comb filter 18, where the L, a and b coefficients define the filter response. In a preferred embodiment the filter coefficients are L=8, 0.8<a<1 and b=1−a in order not to exhibit pass-band gain or attenuation. FIG. 5B shows the frequency response of the anti-comb filter 18 of FIG. 5A for the case where a=0.99. The anti-comb filter 18 is not used when the downlink speech signal (applied through switch S1) is used as the measurement signal.

An 8 kHz measurement generator 20 provides a reference signal for two adaptive filters 22 and 24. The adaptive filters 22 and 24 are preferably LMS-type filters, although other types might be used in other applications. As was previously mentioned, in one (optional) case the downlink speech signal is used as the measurement signal. This measurement is done during the handset mode of operation and the proximity is determined from the impulse response power, not from the shape, as described in more detail below. In this mode the measurement signal generators 14 and 20 are not required, the downlink speech is delivered from the speaker 10 in a normal fashion, but an 8 kHz version of the downlink speech is provided via S1.

The LMS adaptive filter 22, also referred to as a monitoring filter, performs impulse response estimation, wherein the adaptive LMS filter coefficients can be considered as the impulse response taps. A total of eight taps have been found to be sufficient to detect changes that occur in the environment close to the phone. Filter 22 performs the actual measuring, that is, it functions to monitor rapid changes near the phone. Since speed is of importance, relatively large step sizes are used. A delay line function feeds an internal LMS filter delay line with the reference signal, which can be the output of the 8 kHz measurement signal generator 20, or the downlink speech signal, as discussed above. The desired response signal, i.e., the signal which the adaptive filter 22 attempts to estimate by filtering the reference signal, is the processed microphone 12 signal after decimation or anti-comb filtering. As was mentioned, the anti-comb filtering function 18 is not used when the downlink speech signal is used. In any event, new filter coefficients W1 are generated at each sampling instant. These coefficients are then compared in difference block 26 (after scaling in block 22A) to the (scaled) coefficients (W2) that represent the handsfree situation.

The second (modelling) LMS adaptive filter 24 functions to update the handsfree impulse response model and, as such, operates only in the handsfree situation. The handsfree impulse response has been found to be relatively stable, although it may drift between various handsfree situations, as well as during the same handsfree situation. In order to follow these slow variations, and not react to sudden, rapid changes, the step size is made relatively small (relative to the monitoring LMS filter 22). This is preferably accomplished by operating the LMS filter 24 with 32-bit accuracy, and the LMS filter 22 with 16-bit accuracy. Note that both filters 22 and 24 use the same input signals, and that only the computational accuracy is made different to allow for the difference in step size.

In the handsfree situation both the monitoring LMS adaptive filter 22 and the modelling LMS adaptive filter 24 are active, and their respective coefficients W1 and W2 are compared in difference block 26. Since the monitoring LMS adaptive filter 22 responds to rapid changes, while the modelling LMS adaptive filter does not, there will be a difference between their coefficients when some object comes near to the phone or, more precisely, to the earpiece. When this happens, the phone is switched to the handset mode.

The scaling blocks 22A and 24A are used to scale or normalize the impulse response estimates provided by the monitoring LMS adaptive filter 22 and the modelling LMS adaptive filter 24, respectively. After scaling the sum of the impulse response coefficients is one, and the original sum, before scaling, is stored into an additional (ninth) coefficient. In addition, both of the scaled responses are represented with 16-bit accuracy. The scaling is performed in order to remove the effect of power or gain changes on the impulse response path. As such, after scaling only the shape or model of the impulse response affects the comparison result performed by block 26. The result is that the comparison is more robust against background noise and any gain changes. However, if the power information should be required for some purpose, as described below, it is conveniently available as the ninth coefficient of the responses.

The difference block 26 computes the difference of the scaled impulse response estimates. Simply, each of the corresponding coefficients are subtracted from one another and the absolute values of the differences are summed together to form a single measure of the similarity of the two response estimates. As long as the result is zero or close to zero, the phone remains in the handsfree mode. However, as soon as the difference deviates from zero by more than some threshold amount, the phone is switched to the handset mode.

In general, the phone will be in a default, handset mode. Since the handsfree activation is normally commanded by the user, such as by pressing a button, the proximity detection function is not required to be activated until the handsfree made is indicated. However, since information as to whether the phone is on the user's ear, or some millimeters away, may be useful for other functions in the phone, the proximity detection circuitry can be used as well in the handset mode. It is in this case that the downlink speech signal can be used instead of the generated frequency signals. Since the speech is the measurement signal, bandpass filtering is used in the decimation block 16 and the anti-comb filtering block 18 is bypassed. The LMS adaptive filter 22 is used to estimate the impulse response and the relevant proximity measure, the impulse response power, is obtained as the above-mentioned ninth coefficient of the of the resulting W1 vector. If the power measure is larger than some threshold, the phone is assumed to be on the ear, otherwise it is assumed that the phone is not on the ear.

Alternatively, the signal generators are used as in the handsfree case, the scaling block 22A outputs a current impulse response estimate W1, which is compared to a stored handsfree model W2 in the difference block 26. If the difference is larger than some threshold, the phone is assumed to be on the ear, otherwise the phone is assumed to not be on the ear.

Before transitioning from the handset mode to the handsfree mode it is preferred to first transition through a handsfree verification mode where the phone actually verifies that the phone is not on the user's ear. In the handsfree verification mode it is preferred to use, for robustness, the impulse response power measurement method that was described above. Furthermore, in the high frequency range (16 kHz–20 kHz) the impulse response power does not behave consistently according to the handset and handsfree situations. As such, it is preferred to use a lower frequency band (0–4 kHz) signal in the generator 14 and decimator 16 functions, where the distinction between the handset and handsfree situations is more clearly seen in the impulse response power. While this measurement signal is audible, it does not create a disagreeable audible signal, and it is heard by the user as a simple tone only if the phone happens to be on the ear when the handsfree mode is activated.

If the result of this lower frequency impulse response power measurement indicates that the phone is truly in the handsfree mode, then the phone is switched to this state, otherwise the phone remains in the handset mode. When in the handsfree mode, if the proximity detection technique in accordance with this invention indicates that an object has approached the phone, more specifically the earpiece, then the phone is switched automatically back to the handset mode.

It is noted that switching between the handset and the handsfree modes can involve more than simply adjusting the volume of the audio signal output from the speaker 10. For example, any number of audio enhancement signal processing techniques or algorithms can be selected, or modified, or tuned depending on whether the handset or the handsfree mode is currently in effect.

Furthermore, and as was previously mentioned, the teachings of this invention are not limited for use in only mobile telephones, such as cellular telephones and personal communicators, but may be used in other devices and applications as well.

Thus, while the invention has been particularly shown and described with respect to preferred embodiments thereof, it will be understood by those skilled in the art that changes in form and details may be made therein without departing from the scope and spirit of the invention.

What is claimed is:

1. A method for detecting if an object is in proximity to a communication device, comprising steps of:
    generating a measurement signal;
    driving an output acoustic speech transducer of the communications device with the measurement signal, wherein the measurement signal is <20,000 Hz;
    monitoring an input acoustic speech transducer of the communications device to detect the measurement signal; and
    determining that an object is in proximity to the communications device based on a detected alteration of the measurement signal.

2. A method as in claim 1, wherein the communications device comprises a mobile telephone.

3. A method as in claim 1, wherein the communications device comprises a personal communicator.

4. A method as in claim 1, wherein the communications device comprises a mobile telephone, and wherein the step of determining is used to verify that a handsfree mode of operation can be entered.

5. A method as in claim 1, wherein the communications device comprises a mobile telephone, and wherein the step of determining is used to set a volume of a signal driving a speaker.

6. A method as in claim 1, wherein the communications device comprises a mobile telephone, and wherein the step of determining is used to select, modify, or tune an audio processing technique.

7. A method as in claim 1, wherein the communications device comprises a mobile telephone, and wherein the step of determining is used to automatically enter a handset mode of operation from a handsfree mode of operation.

8. A method as in claim 1, wherein the steps of monitoring and determining comprise steps of operating plural adaptive filters in parallel on the same input data, with different step sizes, for generating first and second impulse response estimates, respectively, and comparing a difference between the first and second impulse response estimates to a threshold.

9. A communications device comprising an output acoustic speech transducer and an input acoustic speech transducer, said communications device further comprising a unit for detecting if an object is in proximity to the communications device, comprising:
    a measurement signal generator for driving said output acoustic speech transducer of said communications device, wherein the measurement signal is <20,000 Hz;
    means for monitoring said input acoustic speech transducer of said communications device to detect the measurement signal; and
    means for determining that an object is in proximity to said communications device based on a detected alteration of the measurement signal.

10. A communications device as in claim 9, wherein the communications device comprises a mobile telephone.

11. A communications device as in claim 9, wherein the communications device comprises a personal communicator.

12. A communications device as in claim 9, wherein the communications device comprises a mobile telephone, and wherein said means for determining is used to verify that a handsfree mode of operation can be entered.

13. A communications device as in claim 9, wherein the communications device comprises a mobile telephone, and wherein said means for determining is used to set a volume of a signal driving a speaker.

14. A communications device as in claim 9, wherein the communications device comprises a mobile telephone, and wherein said means for determining is used to select, modify, or tune an audio processing technique.

15. A communications device as in claim 9, wherein the communications device comprises a mobile telephone, and wherein said means for determining is used to automatically enter a handset mode of operation from a handsfree mode of operation.

16. A communications device as in claim 9, wherein said means for monitoring and said means for determining comprise:

a decimator for decimating a measurement signal received from a microphone;

an anti-comb filter for enhancing the signal to noise ratio (SNR) of the received measurement signal;

first and second adaptive filters operated in parallel on the filtered measurement signal, whit different step sizes, for generating first and second impulse response estimates, respectively; and a comparator for comparing a difference between the first and second impulse response estimates to a threshold.

17. A method for detecting if an object is in proximity to a communications device, comprising steps of:

generating a measurement signal;

over driving an output acoustic speech transducer of the communications device with the measurement signal, wherein the measurement signal is above 16,000 Hz;

monitoring an input acoustic speech transducer of the communications device to detect the measurement signal; and determining that an object is in proximity to the communications device based on a detected alteration of the measurement signal.

\* \* \* \* \*